US012099337B1

(12) United States Patent
Al-Husseini et al.

(10) Patent No.: US 12,099,337 B1
(45) Date of Patent: Sep. 24, 2024

(54) CONTROL MOMENT GYROSCOPE HOIST STABILIZATION SYSTEM, METHOD, AND APPARATUS

(71) Applicant: Vita Inclinata IP Holdings LLC, Broomfield, CO (US)

(72) Inventors: Mahdi Al-Husseini, Douglasville, GA (US); Joshua Barnett, Stanford, CA (US); Anthony Chen, Stanford, CA (US); Derek Sikora, Denver, CO (US)

(73) Assignee: Vita Inclinata IP Holdings LLC, Broomfield, CO (US)

( * ) Notice: Subject to any disclaimer, the term of this patent is extended or adjusted under 35 U.S.C. 154(b) by 793 days.

(21) Appl. No.: 17/112,804

(22) Filed: Dec. 4, 2020

Related U.S. Application Data

(60) Provisional application No. 62/944,432, filed on Dec. 6, 2019.

(51) Int. Cl.
*G05B 19/04* (2006.01)
*B66C 13/08* (2006.01)
*G05B 19/042* (2006.01)

(52) U.S. Cl.
CPC .......... *G05B 19/042* (2013.01); *B66C 13/085* (2013.01); *G05B 2219/2667* (2013.01)

(58) Field of Classification Search
CPC .......... G05B 19/042; G05B 2219/2667; B66C 13/085
See application file for complete search history.

(56) References Cited

U.S. PATENT DOCUMENTS

| | | | |
|---|---|---|---|
| 2,264,936 A | 12/1941 | Dorsa | |
| 5,131,491 A | 7/1992 | Varner et al. | |
| 5,299,845 A * | 4/1994 | Gabriel | B66C 1/34 |
| | | | 294/82.32 |
| 5,396,815 A * | 3/1995 | Polites | B64G 1/22 |
| | | | 74/61 |
| 5,816,636 A | 10/1998 | Gibson et al. | |
| 5,927,438 A | 7/1999 | Ostrobrod | |
| 6,814,185 B1 | 11/2004 | Ostrobrod | |
| 7,131,515 B2 | 11/2006 | Gartsbeyn et al. | |
| 8,025,167 B2 * | 9/2011 | Schneider | B66C 13/063 |
| | | | 212/276 |
| 8,925,901 B2 | 1/2015 | Gaillard | |
| 8,938,325 B1 * | 1/2015 | McGinnis | B66C 13/08 |
| | | | 701/4 |
| 9,375,841 B1 * | 6/2016 | Kemper | B25J 13/085 |
| 9,688,404 B1 | 6/2017 | Buchmueller et al. | |
| 9,797,723 B1 * | 10/2017 | Huang | G01C 19/04 |
| 9,850,113 B2 | 12/2017 | Melin et al. | |
| 10,918,892 B2 | 2/2021 | Dickson | |
| 11,370,642 B2 | 6/2022 | Markwell | |
| 2002/0113448 A1 | 8/2002 | Kazerooni et al. | |

(Continued)

FOREIGN PATENT DOCUMENTS

| | | |
|---|---|---|
| JP | H04256686 A | 9/1992 |
| JP | H07179288 A | 7/1995 |
| JP | H1111859 A | 1/1999 |

*Primary Examiner* — Kyle O Logan

(57) ABSTRACT

An apparatus, system, and or method to influence at least one of a position, orientation, or motion of a load suspended by a suspension cable from a carrier, comprising a housing secured to at least one of a single-axis control moment gyroscope or a multi-axis control moment gyroscope.

2 Claims, 2 Drawing Sheets

(56) References Cited

U.S. PATENT DOCUMENTS

| | | | | |
|---|---|---|---|---|
| 2004/0268349 | A1* | 12/2004 | Ramakrishnan | G06Q 10/10 |
| | | | | 718/100 |
| 2006/0065485 | A1* | 3/2006 | Reed | A62B 1/02 |
| | | | | 182/82 |
| 2006/0163892 | A1 | 7/2006 | Nguyen et al. | |
| 2008/0017601 | A1* | 1/2008 | Neupert | B66C 13/085 |
| | | | | 212/270 |
| 2009/0200428 | A1* | 8/2009 | Smith | B64G 1/286 |
| | | | | 244/165 |
| 2009/0281655 | A1* | 11/2009 | McKernan | B66F 9/20 |
| | | | | 700/229 |
| 2010/0000349 | A1* | 1/2010 | Stevens | B64G 1/286 |
| | | | | 74/5.4 |
| 2012/0051879 | A1* | 3/2012 | Davis | B66C 13/08 |
| | | | | 74/5.34 |
| 2013/0299440 | A1* | 11/2013 | Hermann | B66C 15/065 |
| | | | | 340/8.1 |
| 2016/0009531 | A1* | 1/2016 | Saliba | B66C 19/007 |
| | | | | 701/19 |
| 2016/0240417 | A1* | 8/2016 | Tomida | B66C 13/085 |
| 2016/0297650 | A1* | 10/2016 | Bang | B66C 13/085 |
| 2016/0298962 | A1* | 10/2016 | Lee | B64C 17/06 |
| 2017/0009859 | A1* | 1/2017 | Sevagen | B64C 13/32 |
| 2018/0251346 | A1* | 9/2018 | Thomson | B66C 1/10 |
| 2019/0016480 | A1* | 1/2019 | Kashiwa | H02K 7/14 |
| 2020/0165010 | A1* | 5/2020 | Sun | B64G 1/36 |
| 2023/0227131 | A1* | 7/2023 | Sohacki | G01C 21/3602 |
| | | | | 114/122 |

\* cited by examiner

CONTROL MOMENT GYROSCOPE HOIST STABILIZATION SYSTEM, METHOD, AND APPARATUS

CROSS-REFERENCE TO RELATED APPLICATIONS

This application is a non-provisional of, incorporates the subject matter of by this reference, and claims the benefit of the filing date of U.S. provisional patent application No. 62/944,432, filed Dec. 6, 2019, and titled Control Moment Gyroscope Hoist Stabilization System.

FIELD OF INVENTION

The present invention reduces the angular momentum of an object hoisted by a carrier, such as a helicopter or crane, with torque from one or more control moment gyroscope (CMG) selectively induced by a controller.

BACKGROUND OF INVENTION

Rotating helicopter blades may introduce a force, e.g. downwash, that causes hoisted objects to spin out of control. Spin of hoisted objects can also be caused by other external forces, such as wind, contact with the environment, and the like. Spin is problematic for aeromedical evacuations, for hoist operations by cranes, and the like. As discussed herein, a "carrier" may be a helicopter, a crane, a fixed-wing aircraft, and the like, as the foregoing may carry an object on a cable.

Prior Art. The present invention aside, existing means to stabilize hoisted objects comprise tag-lines, active fins, and fan matrices.

A tag-line is a line securing the hoisted object to the ground. While the tag-line is an effective measure, it requires an individual on the ground to secure and unsecure the tag-line and it also requires unencumbered space on the ground to move as the hoisted object is moved. This limits the use of the tag-line to circumstances in which it possible to have an individual on the ground; this may not be possible, such as in "hot zones" where enemy fire is expected, and or may not be convenient or practicable, such as over water, in a construction site, in a remote rescue in a forest, or in many other carrier lift and hoist and sling operations.

An active fin changes its angle of attack in response to an internal gyroscope which senses the angular velocity of the hoisted object. The protruding nature of the active fin relative to the hoisted object may result in the fin breaking off mid-operation. This is especially true in dense terrain. In addition, an active fin is less effective at slower rates of movement or when ambient aerodynamic forces are antagonistic to aerodynamic forces produced by the fin.

A fan matrix may allow for multi-dimensional control of a hoisted load, but may be susceptible to environmental damage, such as due to interaction with the external environment, or other problems. In addition, a load may be massive enough, such as in crane operations or large helicopter operations, that a fan matrix may not be an economical or practical source of torque or thrust.

SUMMARY OF THE INVENTION

Disclosed is one or more control moment gyroscope (CMG), e.g. a single-axis CMG or a multi-axis CMG, used to provide a stabilizing torque, such as counter to a hoisted object's state of spin or sway.

A single-axis CMG may comprise a flywheel suspended within a gimbal, wherein orientation of the gimbal and flywheel may be controlled by a gimbal motor. Single-axis CMGs may only be able to instantaneously target or produce a single torque vector at any given time, as the orientation of the flywheel with respect to its frame will change as the gimbal is actuated. Single-axis CMGs may experience internal singularities, such as momentum saturation singularities, which may prevent torque generation in a desired direction.

A multi-axis CMG system may comprise a plurality of single-axis CMGs, wherein, for example, the plurality of single-axis CMG are secured in a same frame, including in a mirrored-pair configuration, wherein the frame is or comprises an outer gimbal and wherein an outer gimbal motor is used to control orientation of the frame or outer gimbal containing the plurality of single-axis CMGs; such an arrangement may be referred to as a scissored-pair CMG.

Single- and multi-axis CMGs may be configured as variable speed CMGs, double-gimbal CMGs, variable-speed double-gimbal CMGs, and the like. Multi-axis CMG systems may reduce or eliminate internal singularities and or a multi-axis CMG system may produce a combined torque vector that continuously points in one direction during an impulse of gimbals in the multi-axis CMG system.

Unlike a reaction wheel, which changes rotor speed of the reaction wheel in order to produce torque, a CMG rotates the spinning object, e.g. a flywheel, to induce a torque effect. A notable benefit of CMGs is that they tend to be more torque/power efficient that reaction wheels, although they may be more mechanically complex and therefore more difficult to actuate and maintain. CMGs may also be capable of producing more torque than reaction wheels for a given momentum capacity. GMGs and other gyrostabilizers have regularly been used to reduce the torque of vehicles, including ships, cars, satellites, and helicopters. Yet, there has been no demonstrated use of a CMG to counter the spin of a load hoisted by a carrier such as a helicopter.

A hydraulic power line, an electric motor, a fossil fuel engine, and the like may provide power to the CMG; the CMG may be proximate to and secured to the hoisted object. There may be no "protrusion", such would be found with the active fin, to become tangled with or otherwise negatively interact with the environment. Therefore, the likelihood the CMG mechanism is to break or fall during the hoist operation may be reduced. The CMG stabilizer may not require an individual on the ground for operation, as is required of the tagline. The CMG stabilizer may be able to generate more torque than a fan matrix.

DETAILED DESCRIPTION OF THE INVENTION

Figure 1:
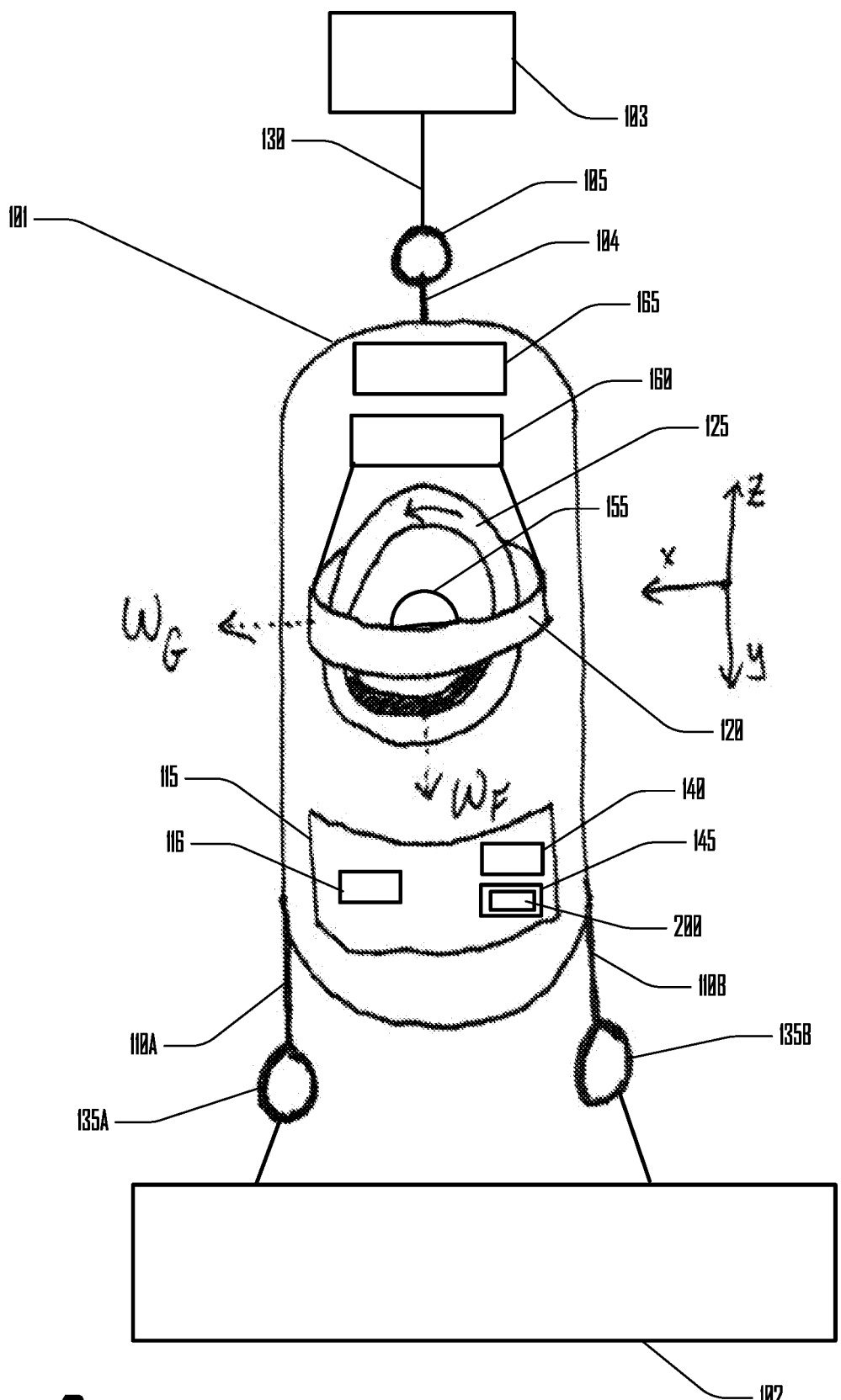
FIG. 1 illustrates an example of a schematic of a control moment gyroscope apparatus for use in conjunction with a carrier.

In the example illustrated in FIG. 1 is a primary cylinder or housing 101, which may be tapered at both ends. The housing 101 may act as a protective outer shell. The housing 101 may comprise a first connection point 104 between a hydraulic power line, power cable, suspension cable 130, or the like extending to, for example, a helicopter, crane, or other carrier 103. The housing may comprise a second or more connection points 110A and 110B, to be secured to a hoisted object or load 102 (such as an occupied medical litter).

Internally or secured to housing 101 there may be a variety of motors, batteries 165, electronic drivers, e.g. in electronic box 115, as well as one or more flywheels 125 and gimbals 120, and a suite of sensors 116, e.g. in electronics box 115 and or elsewhere on or in housing 101.

Housing 101 may be secured to hoisting line or suspension cable 130 (which may terminate with a hoisting hook) with a metal loop 105. Housing 101 may thereby transmit forces between load 102 and the carrier. At a bottom of housing 101, there may be loops 135A and 135B for securing straps to the hoisted load 102.

As a result of this configuration, any rotation experienced by load 102 will also be transmitted to the housing 101. The suite of sensors 116 may include an inertial measurement unit and a motor encoder. These devices are responsible for determining the current angular velocity of the load 102 and device (e.g. of housing 101) as well as the angular velocity of flywheel 125. Flywheel 125 may have an axis of rotation, about which the flywheel rotates. The flywheel axis of rotation may be parallel to the ground, or, said another way, may be transverse to a gravitational field. Gimbal may have an axis of rotation, about which the gimbal and flywheel system rotates. The gimbal axis of rotation may be perpendicular to the ground, or, said another way, parallel to the gravitational field.

Information regarding the hoisted object's angular velocity, such as from sensors 116, is fed into a proportional-integral-derivative (PID) loop or a non-linear filter executed by, for example, control module 200 in a computer memory 145, wherein control module 200 comprises instructions executed by computer processor 140, and wherein control module 200 determines a current state of the housing 101 and load 102 and determine desired action of the CMG to induce a torque to stabilize the housing 101 and load 102 against rotation or to rotate the housing 101 and load 102, such as in relation to a target or an obstacle.

The flywheel-gimbal system consists of two sets of motors associated with two degrees of freedom for the CMG. A primary motor or flywheel motor 155 secured to the flywheel may be responsible for spinning flywheel 125 and maintaining it at a near constant angular velocity which constitutes the first degree of freedom. Flywheel 155 and flywheel motor 155 may be suspended within gimbal 120. A secondary motor or gimbal motor 165 may be responsible for actuating the second degree of freedom by rotating gimbal 120, thus rotating flywheel 125 and axis of rotation of flywheel 125.

A control module, such as control module 200, activates flywheel motor 155 to achieve near constant angular velocity in flywheel 125 about the flywheel axis of rotation. The control module activates gimbal motor 165 to rotate spinning flywheel 125 within gimbal 120 about the gimbal axis of rotation. This rotates the axis of rotation of flywheel 125 and results in a change in angular momentum of spinning flywheel 125, which induces a torque on gimbal 120 in a direction that is a cross product between flywheel 125 angular velocity and gimbal 120 actuation angular velocity. Flywheel 125 spins in the y-axis while gimbal 120 rotates in the x-axis, which induces a torque in the z-axis which is coincident with the axis of gravity. The magnitude of this induced torque is proportional to angular momentum of flywheel 125 and angular velocity of gimbal 120. Using this mechanism and process, the CMG system can stabilize or rotate a load.

Housing 101 is illustrated as comprising a single-axis CMG; as discussed herein, housing 101 may comprise a multi-axis CMG.

Figure 2:
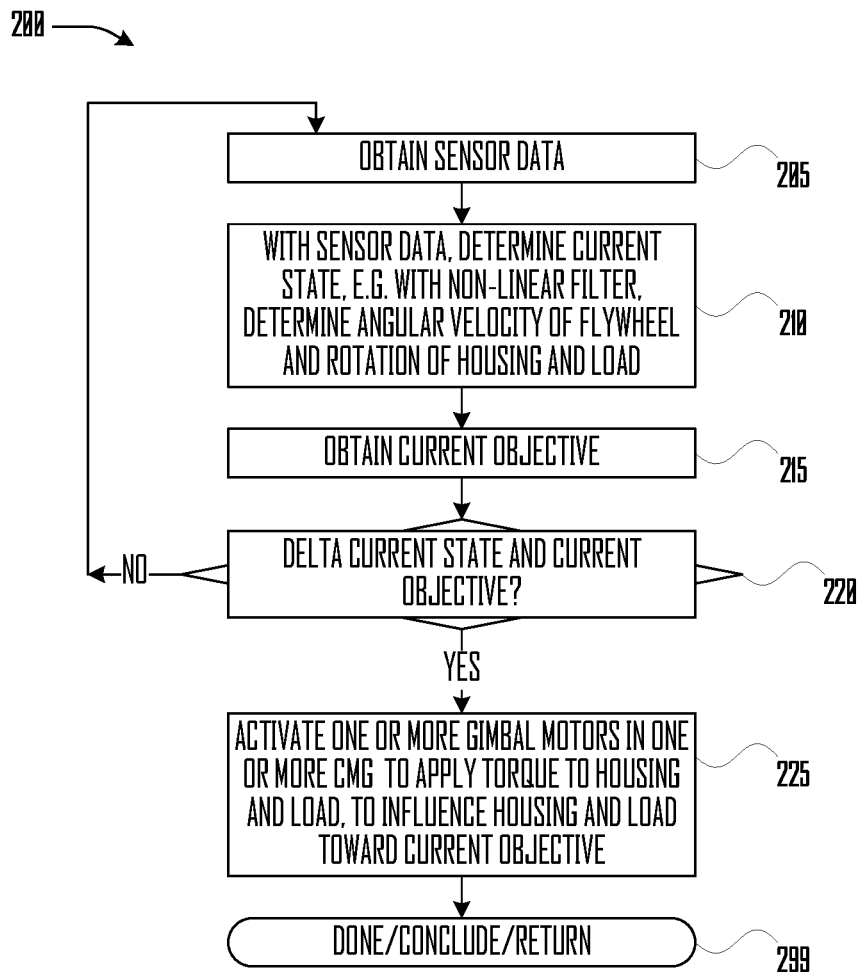
FIG. 2 illustrates an example of a control routine of a control module in accordance with one embodiment.

FIG. 2 illustrates an example of a control routine of control module 200, in accordance with an embodiment. Control module 200 may be stored in, for example, computer memory 145 and performed by, for example, computer processor 140. Logic of control module 200 may further be stored in and performed by appropriately configured circuitry within or logically coupled to housing 101.

At block 205, control module 200 may obtain sensor data, such as from sensors 116.

At block 210, control module 200 may determine a current state of, for example, housing, components within housing, such as of flywheel and gimbal, and or of load. The current state may comprise a rotation or angular velocity and direction of rotation of housing, a rotation or angular velocity and direction of rotation of flywheel, a position or orientation of flywheel 125, a position or orientation of gimbal 120, and the like. The current state may comprise obstacles surrounding the load. The current state may comprise a position, orientation, or motion of the housing and load, including relative to a carrier, including, for example, a distance below a carrier.

At block 215, control module 200 may obtain a current objective. The current objective may be input by a user, by another process, module, routine, or the like. The current objective may comprise, for example, no rotation, obstacle avoidance, or a desired orientation of the load.

At decision block 220, control module 200 may determine whether there is a difference between the current state, e.g. from block 210, and the current objective, e.g. from block 215.

At block 225, if affirmative or equivalent at decision block 220, control module 200 may activate one or more gimbal motors, such as of one or more control moment gyroscopes and or of a single-axis control moment gyroscope and or of a multi-axis control moment gyroscope, to apply torque to housing 101 and load 102, to influence housing 101 and load 102 toward the current objective.

At bock 299, control module 200 may return, for example, to block 205, may conclude, and or may return to another process which may have called control module 200.

The apparatuses and methods in this disclosure are described in the preceding on the basis of several preferred embodiments. Different aspects of different variants are considered to be described in combination with each other such that all combinations that upon reading by a skilled person in the field on the basis of this document may be regarded as being read within the concept of the disclosure. The preferred embodiments do not limit the extent of protection of this document.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions. USB (Universal serial bus) may comply or be compatible with Universal Serial Bus Specification, Revision 2.0, published by the Universal Serial Bus organization, Apr. 27, 2000, and/or later versions of this specification, for example, Universal Serial Bus Specification, Revision 3.1, published Jul. 26, 2013. PCIe may comply or be compatible with PCI Express 3.0 Base specification, Revision 3.0, published by Peripheral Component Interconnect Special Interest Group (PCI-SIG), November 2010, and/or later and/or related versions of this specification.

As used in any embodiment herein, the term "logic" may refer to the logic of the instructions of an app, software, and/or firmware, and/or the logic embodied into a programmable circuitry by a configuration bit stream, to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may comprise, for example, singly or in any combination, hard-wired circuitry, programmable circuitry such as FPGA. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

As used herein, the term "module" (or "logic") may refer to, be part of, or include an Application Specific Integrated Circuit (ASIC), a System on a Chip (SoC), an electronic circuit, a programmed programmable circuit (such as, Field Programmable Gate Array (FPGA)), a processor (shared, dedicated, or group) and/or memory (shared, dedicated, or group) or in another computer hardware component or device that execute one or more software or firmware programs having executable machine instructions (generated from an assembler and/or a compiler) or a combination, a combinational logic circuit, and/or other suitable components with logic that provide the described functionality. Modules may be distinct and independent components integrated by sharing or passing data, or the modules may be subcomponents of a single module or be split among several modules. The components may be processes running on, or implemented on, a single compute node or distributed among a plurality of compute nodes running in parallel, concurrently, sequentially or a combination, as described more fully in conjunction with the flow diagrams in the figures.

As used herein, a process corresponds to an instance of a program, e.g., an application program, stored in computer memory and executing on a processor, and a thread corresponds to a portion of the process. A processor may include one or more execution core(s). The processor may be configured as one or more socket(s) that may each include one or more execution core(s).

As used herein "releasable", "connect", "connected", "connectable", "disconnect", "disconnected," and "disconnectable" refers to two or more structures which may be connected or disconnected, generally without the use of tools (examples of tools including screwdrivers, pliers, drills, saws, welding machines, torches, irons, and other heat sources) or with the use of tools but in a repeatable manner (such as through the use of nuts and bolts or screws). As used herein, "attach," "attached," or "attachable" refers to two or more structures or components which are attached through the use of tools or chemical or physical bonding, but wherein the structures or components may not generally be released or re-attached in a repeatable manner. As used herein, "secure," "secured," or "securable" refers to two or more structures or components which are connected or attached.

The invention claimed is:

1. A load control system to influence at least one of a position, orientation, or motion of a load suspended by a suspension cable from a carrier, comprising:
   a housing secured to and surrounding a first control moment gyroscope ("CMG") and a second CMG;
   wherein the first CMG comprises a first gimbal motor and a gimbal;
   wherein the first gimbal motor is to rotate the gimbal about a gimbal axis of rotation;
   wherein the gimbal is secured to a flywheel motor and a flywheel;
   wherein the flywheel has a flywheel axis of rotation;
   wherein the housing comprises a first connection to the suspension cable and a second connection to the load and wherein the housing transmits a force between the load, the suspension cable, and the carrier;
   wherein the flywheel axis of rotation is parallel to a ground below the load and wherein the gimbal axis of rotation is perpendicular to the ground below the load;
   wherein the housing further comprises a second CMG with a second gimbal motor;
   wherein the housing further comprises a sensor suite and a computer processor and a memory;
   wherein the memory comprises a control module which, when executed by the computer processor, is to obtain a sensor data from the sensor suite and determine, based on the sensor data, an angular velocity of the flywheel, a current rotation of the load control system and load, a desired rotation of the load control system and load, and is to activate the first gimbal motor to rotate the gimbal and the flywheel axis of rotation and is to active the second gimbal motor and is to thereby apply a torque on the load control system and load to influence the current rotation of the load control system and load toward the desired rotation of the load control system and load; and
   wherein the desired rotation of the load control system and load is one of no rotation, a rotation to avoid an obstacle, or a rotation to achieve a desired orientation of the load.

2. A computer implemented method to influence a rotation of a load suspended by a suspension cable from a carrier, comprising:

providing a housing secured to and surrounding a first control moment gyroscope ("CMG"), wherein the first CMG comprises a first gimbal motor and a gimbal, wherein the first gimbal motor is configured to rotate the gimbal about a gimbal axis of rotation, wherein the gimbal is secured to a flywheel motor and a flywheel, wherein the flywheel has a flywheel axis of rotation;

wherein the housing further comprise a second CMG;

wherein the housing comprises a sensor suite, and wherein the housing comprises a first connection point to the suspension cable and a second connection point or points to the load;

with the housing, transmitting a force between the first connection point to the suspension cable and the second connection point or points to the load;

with a computer processor, obtaining a sensor data from the sensor suite, determining, based on the sensor data, an angular velocity of the flywheel, a current rotation of the housing and load, and a desired rotation of the housing and load, and activating the first gimbal motor in the first CMG and the second gimbal motor in the second CMG and thereby applying the torque on the housing and load to influence the current rotation of the housing and load toward the desired rotation of the housing and load;

wherein the desired rotation of the load control system and load is one of no rotation, a rotation to avoid an obstacle, or a rotation to achieve a desired orientation of the load.

\* \* \* \* \*